3,477,006
MOTOR CONTROL CIRCUIT WITH DE-
CELERATION CONTROL MEANS
Donald G. Fair, Belvidere, and Bertil T. Anderson, Rockford, Ill., assignors to Sundstrand Corporation, a corporation of Illinois
Continuation-in-part of application Ser. No. 478,701, Aug. 10, 1965. This application Oct. 13, 1966, Ser. No. 586,426
Int. Cl. H02p 5/00; H02k 27/20; G05b 5/00
U.S. Cl. 318—331        25 Claims

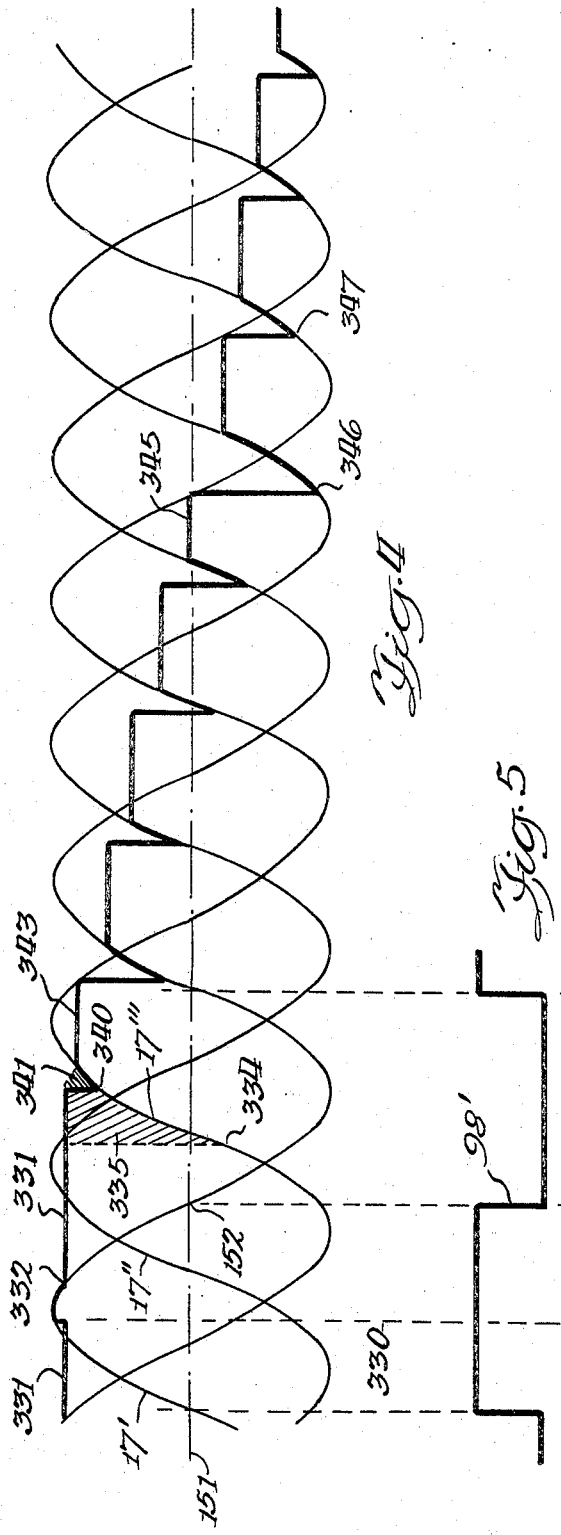
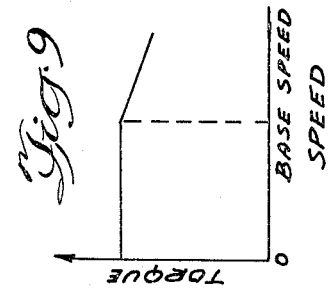
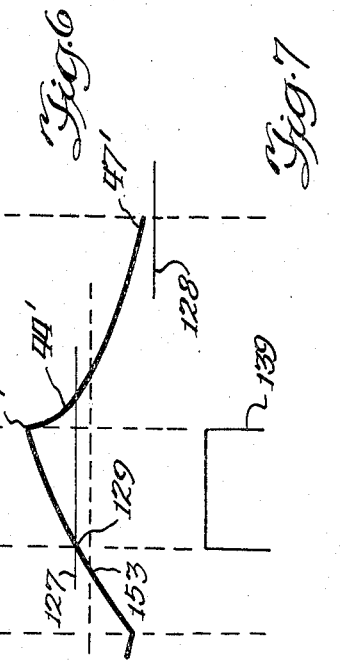

ABSTRACT OF THE DISCLOSURE

A control circuit for energizing the armature and field of a DC motor from a three-phase AC source. Each phase of AC is coupled to a pair of reverse poled SCR's which pass up to 120° of the AC waveform, in either polarity, to the motor armature. For high motor speeds, the armature voltage is held constant while a field control circuit varies the magnitude of DC current to the motor field winding. A phase back safety circuit determines when the motor is to decelerate, and retards the firing point of the SCR's. A clamp safety circuit prevents the SCR's from being fired to brake the motor when back EMF exceeds a predetermined level. A field cut-off safety circuit dissipates excessively back EMF by shunting the motor field, without affecting the speed of rotation of the armature.

SPECIFICATION

This application is a continuation-in-part of our co-pending application, "Motor Control Circuit," Ser. No. 478,701, filed Aug. 10, 1965.

This invention relates to a control circuit, and more particularly to a control circuit for a rotating electrical machine.

D.C. motors may be operated over a substantial range of speeds by controlling both the armature and the field of the motor in a known manner. Prior control circuits have energized a D.C. motor by connecting a three phase A.C. wave source to the armature of the motor through controlled rectifiers, such as silicon controlled rectifiers (SCR's). The portion of the half cycle of the AC wave passed by each SCR determines the D.C. terminal voltage across the armature, for controlling the motor at slower speeds. To control the D.C. motor at higher speeds, prior circuits have held the armature terminal voltage constant while varying the magnitude of D.C. current through the field winding.

When a D.C. motor is to decelerate quickly to a slower speed, or to a stop before reversing its direction of rotation, it is necessary to gate SCR's poled in the opposite current flow direction compared with the SCR's previously gated, in order to pass oppositely flowing unidirection current for braking the motor. Unfortunately, a rotating motor, unlike most other types of loads, generates a large amplitude back EMF voltage across the armature, which is opposite in polarity to the voltage normally gated by the SCR's. When the oppositely poled SCR's are fired for braking the motor, the back EMF adds to the voltage gated in the braking direction, creating large current surges which violently decelerate the motor. These violent current surges can cause destruction of the motor itself, as well as to the connected load rotated by the motor. Furthermore, this violent deceleration condition becomes increasingly serious at higher motor speeds, which generate even higher amplitudes of back EMF.

In accordance with the applicants' invention, an armature and field control circuit interact to control a D.C. motor throughout a substantial range of speeds. This is accomplished by saturating the field and varying the armature terminal voltage at slow speeds, and maintaining the armature terminal voltage at the maximum allowable value and varying the field of the motor for higher speeds, which method of operation is known. The present invention, however, accomplishes this method of operation in a greatly improved manner. The armature control portion of the circuit generates trigger signals for firing controlled rectifiers connected between a three phase A.C. power source and the armature of the motor. This portion of the circuit, absent the components which cause the interaction with the field control, is substantially that disclosed in our before identified copending application.

The field control portion of the circuit gates a variable D.C. current to the field winding of the motor. The motor speed is changed by varying the field current to a new value corresponding to the desired speed.

In addition, the control circuit incorporates a number of safety circuits which obviate the problems existing in prior motor control circuits due to the back EMF. For example, a phase back circuit determines when the motor is to decelerate, and is responsive thereto for modifying the operation of the armature control circuit. The firing point of the SCR's is shifted, causing substantially smaller braking current surges to be gated to the armature of the motor for smoother deceleration.

A clamp circuit prevents the SCR's from being fired, braking the motor, when the back EMF exceeds a predetermined high level. Another of the safety circuits allows excessive back EMF to be smoothly and quickly dissipated by cutting off and shunting the field of the motor, without affecting the speed of rotation of the armature.

The individual parts which form the overall control system include circuits which are useful in many applications, and are not limited to use in motor control systems. Furthermore, the various control and safety circuits may be used in different combinations depending upon the exact control operation to be performed.

One object of the invention is the provision of an improved control circuit capable of safety and efficiently operating a D.C. motor over a substantial range of speeds.

Another object of the invention is the provision of a motor control circuit incorporating safety circuits which obviate problems otherwise occurring due to the presence of back EMF across a D.C. motor armature.

A further object of this invention is the provision of a motor control circuit responsive to a predetermined amplitude of back EMF for maintaining a control signal at a minimum value, preventing the controlled rectifiers which are to pass braking current from being energized until the excessive back EMF drops to a safe level.

Yet another object of this invention is the provision of a motor control circuit which determines when the motor is to decelerate, and is responsive thereto for modifying the operation of the control circuit to cause the rotating motor to decelerate smoothly.

Still a further object of this invention is the provision of a control circuit which gates unidirectional current to the field coil of a motor, and which is responsive to an excessive amplitude of back EMF across the motor armature for discontinuing current flow through the field coil and for shunting voltage which is generated in the field coil by the collapsing magnetic flux of the field, to dissipate the excessive EMF smoothly.

Yet a further object of this invention is the provision of a control circuit for energizing each of a pair of parallel connected oppositely poled controlled rectifiers during each cycle of an A.C. signal, for passing similar parts of oppositely going portions of the A.C. signal. The rectifiers are controlled by a pair of signals of equal absolute magnitude and of opposite polarity. When the amplitude of a control signal changes, each of the pair of signals varies by the same absolute amount, to change the portion of the A.C. signal gated by each rectifier.

Still a further object of this invention is the provision of a completely transistorized motor control circuit for precisely controlling the armature and the field of a D.C. motor.

Further features and advantages will readily be apparent from the following specification and from the drawings, in which:

FIGURE 1a is a schematic diagram of a modification of a portion of the circuit of FIGURE 1;

FIGURES 4 to 7 illustrate signal waveforms found in various parts of the control circuit, and in which:

FIGURE 4 shows the power waveform from the three phase power source of FIGURE 1;

FIGURE 5 shows the square wave output from diodes in the driving means illustrated in FIGURE 1;

FIGURE 6 shows the ramp shaped driving waveform coupled to the pulse forming means illustrated in FIGURE 1;

FIGURE 7 shows a square wave generated by the pulse forming means of FIGURE 1;

FIGURE 8 is a horsepower-speed curve for a D.C. motor controlled by the circuits illustrated in the figures; and FIGURE 9 is a torque-speed curve for a D.C. motor controlled by the circuits illustrated in the figures.

Figure 1:
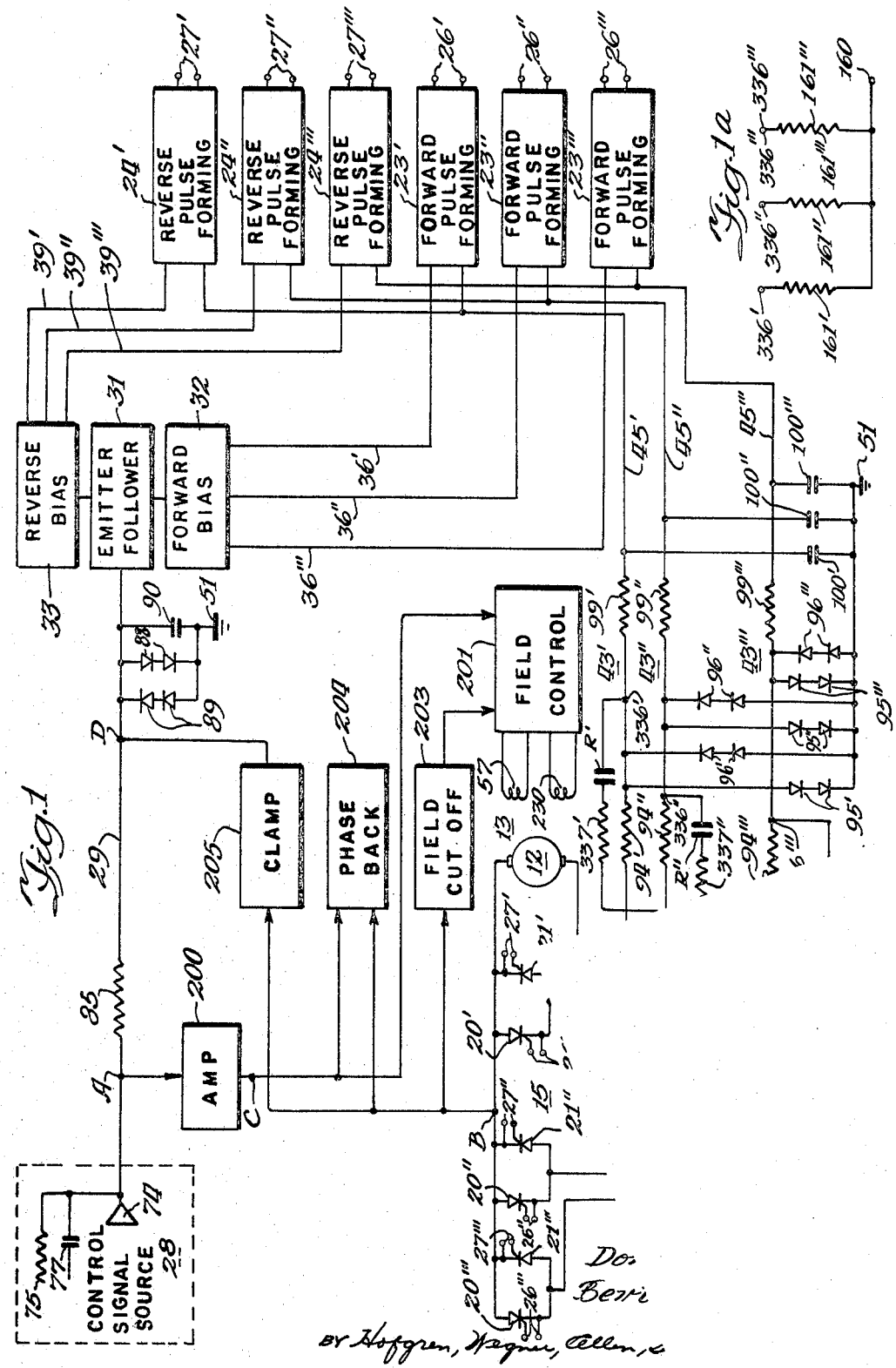
FIGURE 1 is a circuit diagram of an embodiment of the invention, partly in block form and partly in schematic form.

While illustrative embodiments of the invention are shown in the drawings and will be described in detail herein, it should be understood that the invention is capable of embodiment in many different forms, and the present disclosure is to be considered as an exemplification of the principles of the invention and is not intended to limit the invention to the embodiments illustrated. Throughout the specification, values and type designations will be given for the components in order to disclose complete, operative embodiments of the invention. However, it should be understood that such values and types are merely representative and are not critical unless specifically so stated. The scope of the invention will be pointed out in the appended claims.

GENERAL OPERATION

In FIGURE 1, a circuit for controlling the speed of rotation of a D.C. motor 13 is illustrated. Motor 13, having an armature 12 and a field coil 57, is controlled in accordance with information contained in an input control signal from a control signal source 28. The polarity of the control signal indicates the direction motor 13 is to rotate, and the magnitude of the control signal is proportional to the desired speed of rotation of the motor. The base speed of motor 13 is defined as the speed of rotation when the maximum allowable voltage is impressed across armature 12 and the maximum allowable current flows through field coil 57. Assuming, for example, a motor base speed of 850 r.p.m., a ten to one variation in speed, from approximately 85 r.p.m. to 850 r.p.m., is obtained by varying the armature voltage over approximately the same range of magnitudes, as from 24 to 240 volts, while maintaining the field current constant.

Once base speed is attained, the motor speed can be increased to about 4 times base speed by reducing the current through field coil 57, while maintaining the armature voltage constant. The control circuit is responsive to the input control signal to vary automatically the energization of both the armature and the field in the proportions necessary to drive the motor from $\frac{1}{10}$ to 4 times base speed in direct linear relation to the magnitude of the input control signal.

For convenience, all parts previously disclosed and explained in our copending application are identified in this application by the same reference numeral. Some of the components and voltages have somewhat different values but the operation of the circuits is the same. For a more complete description of the structure or operation of any of these parts, which carry numerals from 10 through 161, reference should be made to our copending application. The reference numerals for elements disclosed in this application and not in the parent begin with 200.

The horsepower-speed curve for motor 13 when drawing rated current through armature 12 is illustrated in FIGURE 8, and the torque-speed curve is illustrated in FIGURE 9. When operating the motor from zero through base speed, the field is saturated at all times and the armature terminal voltage is varied. This produces a constant torque drive which is well suited for machine tool applications. Actually, this range represents constant torque per ampere. As the motor draws less than rated current, the torque-speed curve is displaced downward, but still has the same shape. Similarly, at less than rated current, the horsepower is less, and the line between zero and base speed on the horsepower-speed curve has a lesser slope. Once the motor reaches its base speed, the voltage impressed across the armature is maintained at the maximum allowable value, and the field of the motor is weakened by reducing the amount of current gated to field coil 57. Although the speed of the motor increases, the torque decreases proportionally as the field is weakened. Since horsepower is a function of speed times torque, the motor operates in its constant horsepower range at this time.

The operation of the armature control portion of the circuit will be described insofar as it is essential for an understanding of the present invention. A source of three phase A.C. power 10, having terminals 11′, 11″, 11‴, is operatively coupled to armature 12 by gating means 15, which comprise pulse actuated unidirectional conduction means, as silicon controlled rectifiers (SCR's). As seen in FIGURE 4, three phase energy with a 220 volt power waveform 17′, 17″, and 17‴, each displaced 120° from the adjacent power waveforms, are available at the respective terminals 11′, 11″, 11‴. Throughout the specification, reference numerals with the same number of primes all refer to the same phase of power from the three phase A.C. source 10.

Gating means 15 includes SCR's 20, each respectively coupled to one phase of the three phase source, and poled to pass current in a direction which has been arbitrarily designated as forward, i.e., motor armature 12 turns in a forward direction when SCR's 20 conduct. SCR's 21 are poled in a reverse direction and are each respectively coupled to one phase of source 10. The point on power waveform 17 at which the SCR associated therewith begins conduction controls the amount of armature voltage.

A forward pulse forming means 23 and a reverse pulse forming means 24 for each phase of three phase power are coupled between control signal source 28 and the SCR's. Each of the forward pulse forming means 23 has output lines 26 which are directly coupled to the corresponding gate input of the forward poled SCR's 20. Similarly, each of the reverse pulse forming means 24 has output lines 27 directly coupled to the gate input of the reverse poled SCR's 21. Only the forward or the reverse pulse forming means is energized at any instant of time, for generating pulses on either output lines 26 or 27 in order to fire the SCR's coupled thereto.

The pulse forming means 23 and 24 are controlled in accordance with the presence or absence of a control signal from a control signal source 28. The control signal may originate from an external tape machine having an output command signal indicating the desired motor speed. A tachometer may be connected in a closed loop with the output signal circuit, as disclosed in our before identified co-pending application, having an output signal indicating the instantaneous motor speed. These signals may be combined to form the control signal, which indicates what the motor should do to attain the desired speed. This control signal is coupled to a differential operational amplifier 74 in source 28, and through a 5.6 kilohm voltage dropping resistor 85 to a line 29 connected to the armature control circuit. The control signal has a polarity that indicates the direction motor 13 is to turn, and a magnitude that indicates the desired motor speed.

For example, at a junction point A between amplifier 74 and resistor 85, the control signal may have a magnitude from 0 through ±6 volts, with ±1.5 volts representing the base speed of motor 13. The control circuit increases the terminal voltage across armature 12 as the control signal at junction A varies from 0 through ±1.5 volts, and thereafter weakens the current through field coil 57 as the control signal varies from ±1.5 volts through its maximum value.

Preferably, the control circuit linearly varies speed from 0 through maximum r.p.m. (at about 4 times base speed) with respect to the control signal at junction A.

In order to control the terminal voltage across armature 12 as the control signal at junction A varies between 0 and ±1.5 volts, the time of firing of SCR's 20 and 21 is varied in proportion to the absolute magnitude of the control signal. For this purpose, the control signal on line 29 is coupled to an emitter follower 31 which is a portion of a forward bias means 32 and a reverse bias means 33. The forward 32 and reverse 33 bias means have output lines 36 and 39 respectively which carry a bias output signal adjustable throughout a range of magnitudes. Each of the bias output lines has in the absence of a control signal on line 29 a fixed voltage. Emitter follower 31 causes the current through the bias means to vary in accordance with the polarity and magnitude of the signal on line 29. This varying current causes the bias output signals on output lines 36 and 39 to vary about the fixed value in the same direction as the signal on line 29.

In order to determine the instantaneous portion of the power waveform coupled to each pair of SCR's, a driving means 43 for each phase of source 10 is coupled to terminals 11. Each of the driving means 43 includes a clamp and an integrator which change the power waveforms 17 into a driving waveform 44 which is available at output lines 45. The driving waveform 44' for driving means 43', shown in FIGURE 6, has an actuating or peak point 47' that occurs at the end of every half cycle of the respective power waveform 17', FIGURE 4. Similar driving waveforms 44 (not illustrated) for each of the other two phases are developed by driving means 43" and 43"', and have the same phase relationship with respect to the power waveform coupled thereto as is shown in FIGURES 4 and 6 for the waveforms 17' and 44'.

Each of the pulse forming means 23 and 24 is responsive to the relative magnitudes of the driving waveform 44 and the bias output on either lines 36 or 39 to form a pulse that precedes the occurrence of the peak point 47 of the driving waveform 44 coupled thereto by a time interval proportional to the magnitude of the bias, which in turn is proportional to the magnitude of the control signal on line 29.

This pulse, which is carried on lines 26 or 27, actuates the SCR coupled thereto, passing similar portions of only one-half cycle of the power waveforms 17 to the armature 12 of the motor. The forward and reverse bias means may, if desired, be designed to gate cross fire spikes to armature 12 in the absence of a control signal, as disclosed in detail in our co-pending application.

As the control signal at junction A rises above the transfer point, i.e., the division between the constant torque and constant horsepower ranges (which also corresponds to base speed), the control circuit decreases the current flowing through field coil 57. For this purpose, the control signal at junction A is coupled through an amplifier 200 to a field control circuit 201. Field control 201 causes a saturation current to flow through field coil 57. However, as the control signal at junction A exceeds 1.5 volts, either in the positive or negative direction, field control 201 becomes operative to decrease the current through field winding 57, increasing motor speed.

During the time field control 201 is operative, the armature control circuit maintains the voltage across armature 12 at a fixed value corresponding to the rated voltage for the armature. This is accomplished by clamping the control signal on line 29 at a maximum value, which causes the rated voltage to be impressed across armature 12. For this purpose, a pair of series connected diodes 88 and a pair of oppositely poled series connected diodes 89 are connected after the 5.6 kilohm resistor 85, between line 29 and a reference or ground 51. Diodes 88 and 89 are silicon type 1N1696, each having a 0.6 voltage drop thereacross when conducting. Thus, although the absolute voltage at junction A rises above the 1.5 volt transfer level, the voltage on line 29 cannot exceed a maximum value of ±1.2 volts.

As armature 12 rotates, a back EMF is generated of a value less than the magnitude of the voltage gated to the armature by the SCR's. The difference between the gated voltage and the back EMF causes a current to flow through armature 12, producing a torque sufficient to overcome the losses produced by the motor load and friction. As the external motor load is increased, armature 12 is subject to a greater drag, and hence the speed of rotation drops proportionally. As the speed decreases, the back EMF generated across the armature also decreases, creating a larger voltage difference which causes more current to flow through the armature. Armature 12 may drive a tachometer connected in a closed loop with control signal source 28, as disclosed in our copending application. In such a circuit, the decreased speed of the armature, caused by an increased external load, results in a larger control signal which returns the motor to its original speed.

The back EMF across armature 12 sometimes exceeds the magnitude of the voltage gated to the armature, and this excessive EMF may reach undesirable proportions which could damage the motor and/or the control circuit. To obviate this problem, a field cutoff circuit 203 is provided which smoothly dissipates excessive EMF. The input of field cutoff 203 is coupled to a junction point B which is directly connected to one side of armature 12. Since the other side of armature 12 is directly connected to ground 51, the voltage at junction B is the back EMF generated by the motor. When the back EMF reaches a predetermined excessive level, field cutoff 203 produces an output signal which disables field control 201, stopping the current flow through the field winding 57 and smoothly dissipating the voltage created across winding 57 by collapsing magnetic flux.

It should be noted that when the excessive back EMF exceeds the maximum value of voltage available from power source 10, the SCR's which would normally conduct current through armature 12 are, during this time, back biased and hence inoperative. Since no current flows through armature 12, the motor is in fact coasting, and it is possible to cutoff the current to field winding 57, without causing the speed increase normally expected.

Field control 201 and field cutoff 203, in conjunction with the armature control circuit, provide an effective motor control system for operating a D.C. motor at maximum efficiency. However, in certain critical applications as in machine tools, special problems occur which, if not overcome, would limit the use of the control system to less exacting uses.

One such problem occurs when the rotating motor is to decelerate quickly to a slower speed, or to reverse its direction of rotation. If the motor decelerates slowly no problem occurs, for the control signal at junction A merely slowly decreases in absolute magnitude, and the control circuit is responsive thereto to decrease slowly the speed of rotation of the motor. However, when the motor is to decelerate quickly, the control signal at junction A may reverse polarity. This can occur even though the motor is to decelerate to a slower speed, rather than reversing its direction of rotation, if the motor is connected in a closed loop system, as by a tachometer connected to armature 12.

When the control signal reverses polarity the oppositely poled SCR's are fired, gating a braking current to armature 12. Unfortunately, the back EMF still exists at this time, having a polarity which aids a forward current flow from the SCR's gated to brake the motor. As a result, large surges of braking current pass to armature 12, causing the motor to experience violent, uneven, decreases in speed. Although some D.C. motors can withstand this condition, the external load which is driven by the motor usually cannot.

To overcome this problem, a phase back circuit 204 is provided which smoothly decelerates motor 13 to the new desired speed, regardless of the rate at which the control signal changes in value. One input of phase back circuit 204 is connected to the output junction C of amplifier 200. The other input of phase back circuit 204 is connected to a point which carries a signal indicative of the instant direction of rotation of motor 13, as junction B in the armature circuit. Circuit 204 is responsive to the manner in which these signals change in value, to generate a phase back signal only when the motor is to decelerate. This phase back signal causes the SCR's to fire at a later point on the waveform than they otherwise would, reducing the current surges passed to armature 12, as will appear. After the motor has sufficiently decelerated, phase back circuit 204 automatically disconnects itself from further control over the firing time of the SCR's.

When the motor is rotating at a high speed, and hence generating a large magnitude of back EMF, the initial braking current surges may be of an undesirable magnitude, despite the operation of phase back circuit 204. In such a situation, if the input control signal should reverse polarity before phase back circuit 204 can react to retard the firing angle of the SCR's, a violent braking action would occur, as previously described. Conversely, even though phase back circuit 204 is energized, it may be desirable to prevent the braking SCR's from being energized until the back EMF is reduced to an acceptable level. For this purpose, a clamp circuit 205 is provided which prevents the oppositely poled braking SCR's from being energized until the back EMF drops below a predetermined value. The input circuit for clamp 205 is coupled to the back EMF at junction B. When the motor rotates at a speed above approximately ⅔ base speed, clamp 205 is energized to maintain the voltage on line 29 at a minimum predetermined magnitude. According to the specific embodiment disclosed in the drawings, line 29 is clamped to an absolute value of at least 0.2 volt, representing the minimum command necessary to keep motor 13 turning in the same direction. For example, if the control signal on line 29 is positive, indicating a forward direction of rotation, clamp 205 when energized maintains a signal on line 29 of at least +0.2 volt positive. Clamp 205 prevents the input control signal from reversing polarity when the back EMF is above a predetermined value, hence preventing the oppositely poled SCR's from firing until the value of back EMF drops to a safe level.

A detailed description of the various individual circuits comprising the complete motor control circuit will now be presented.

AMPLIFIER

Figure 2:
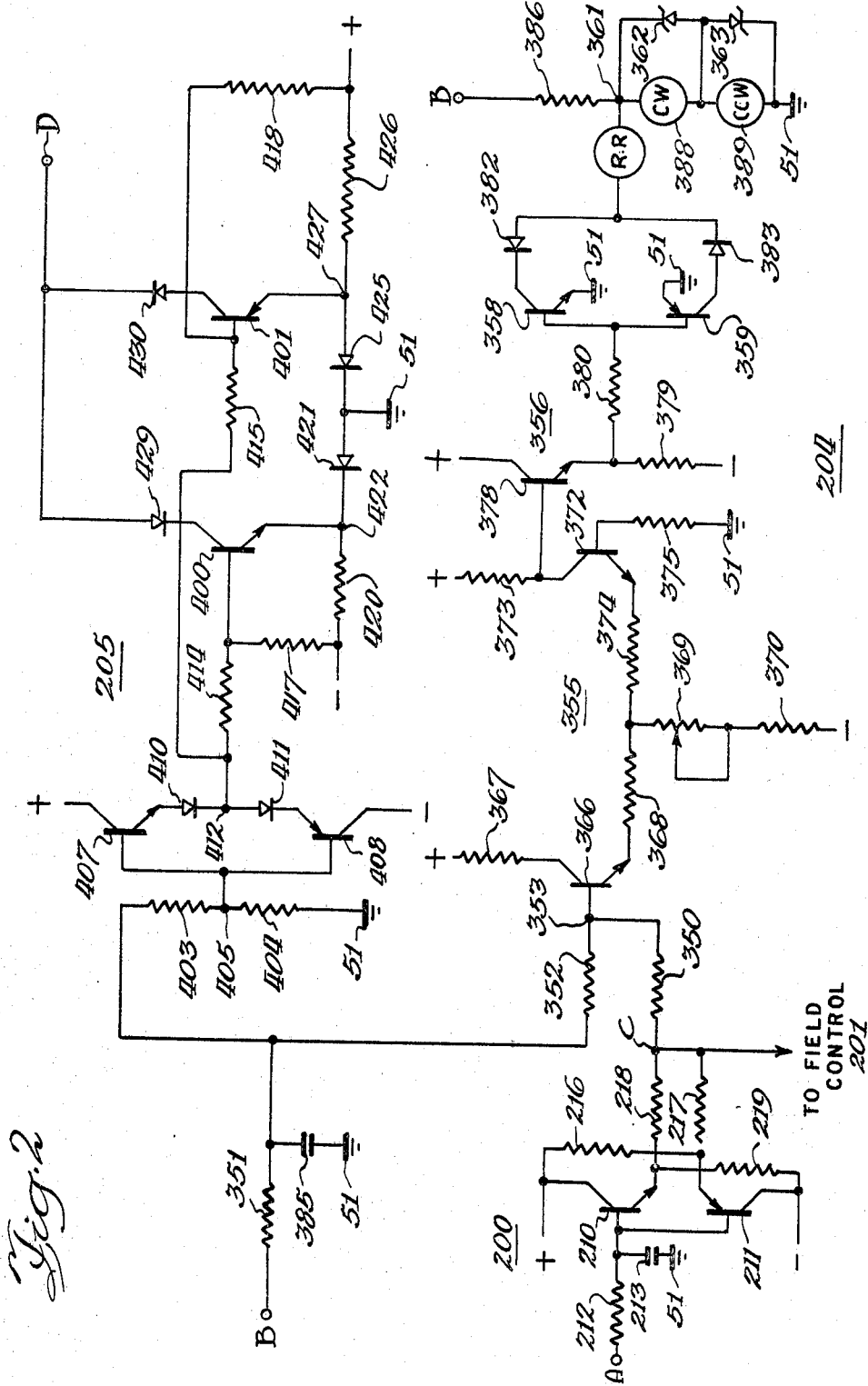
FIGURE 2 is a schematic diagram of the amplifier, clamp, and phase back circuits illustrated in block form in FIGURE 1.

The control signal at junction A is coupled to an emitter follower amplifier 200, seen in detail in FIGURE 2, the output of which drives field control 201 and phase back 204. Amplifier 200 is comprised of a NPN transistor 210, as a 2N1304, and a PNP transistor 211, as a 2N305, connected in an emitter follower type circuit, to provide isolation. Of course, amplifier 200 could be designed to have a gain in excess of unity, if desired. The bases of transistors 210 and 211, which are connected together, are coupled through a 5.6 kilohm resistor 212 to junction point A. A bypass capacitor 213, 0.122 microfarad, is coupled between the base circuit and ground 51.

The collector and emitter electrodes of transistors 210 and 211 are connected across a voltage divider network coupled between voltage sources having equal positive and negative potentials. The positive potential source, labeled as +, may be any conventional D.C. voltage source having an output, for example, of +15 volts. Similarly, the negative potential source, labeled −, may be a conventional D.C. voltage source having a −15 volt output.

The voltage divider network consists of a series connected 2.7 kilohm resistor 216, a 27 ohm resistor 217, a 27 ohm resistor 218, and a 2.7 kilohm resistor 219. Since resistors 216 and 219, and 217 and 218 are of equal value, the junction point C between resistors 217 and 218 is at zero volt potential with reference to ground 51 when no signal is present, due to the equal and opposite voltage drops across the series connected resistors.

The collector of transistor 210 is coupled to the + voltage source, and the emitter is coupled to resistor 218. Similarly, the collector of transistor 211 is coupled to the − voltage source, and the emitter is coupled to resistor 217. The voltage drop across resistors 217 and 218 provides a small voltage, as 0.3 volt, which is positive at the emitter of transistor 211 and negative at the emitter of transistor 210, for forward biasing the emitter-base junction of each transistor. When no signal is present at the base of the transistors, each transistor conducts a small current.

When, for example, a positive potential exists at junction A, transistor 210 conducts more current, and transistor 211 conducts less current, causing the potential at junction C to go more positive with respect to the potential of ground 51, due to transistor 210 shunting part of the current which normally would cause a voltage drop across resistors 216, 217, and 218. Thus, the emitter follower amplifier 200 causes the output signal at junction C to change in the same direction as the input control signal at junction A. For the values given, when the control signal at junction A is +1.5 volts, a +1.2 volt signal is established at junction C.

FIELD CONTROL

Figure 3:
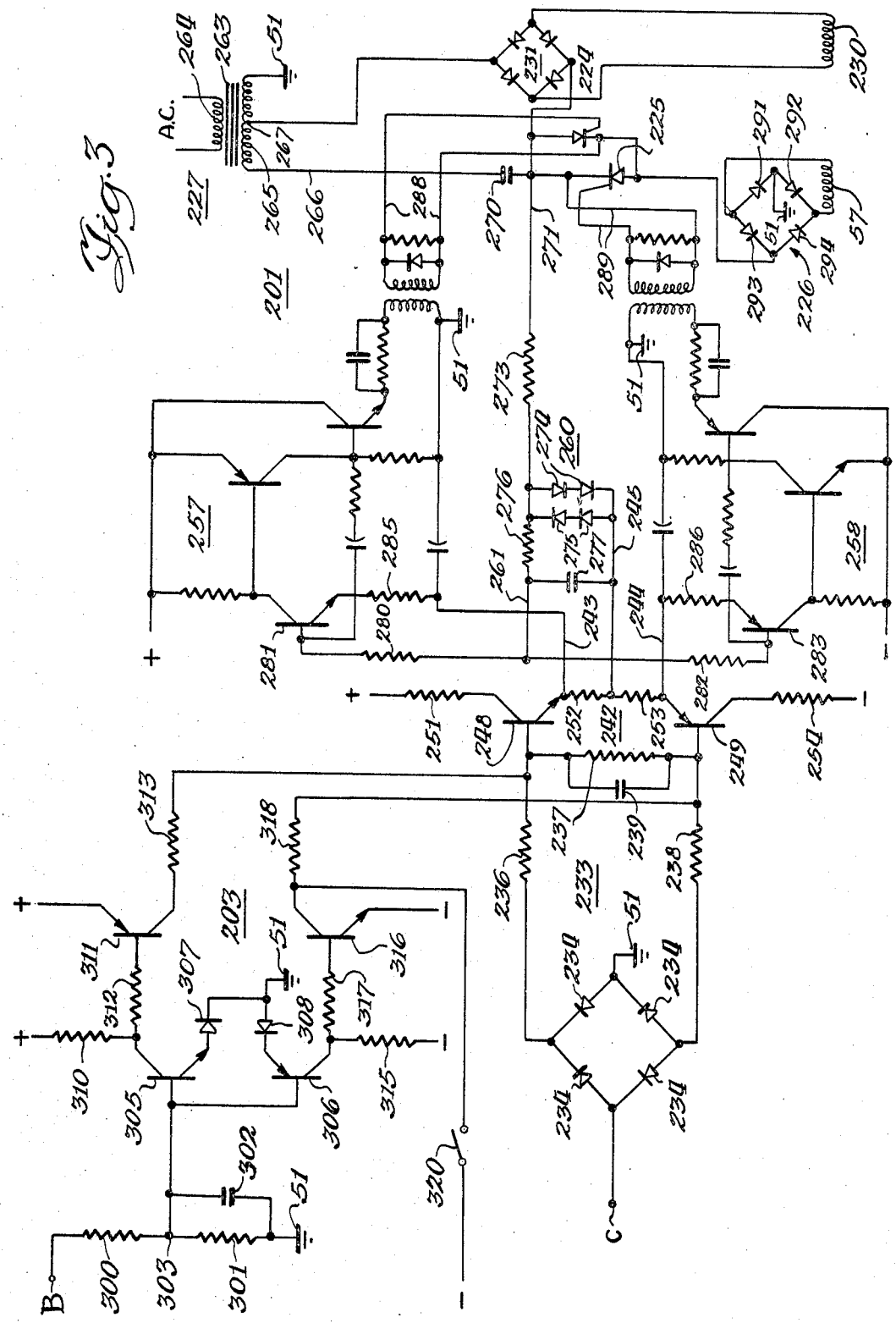
FIGURE 3 is a schematic diagram of the field control and field cutoff circuits illustrated in block form in FIGURE 1.

The output signal at junction C of amplifier 200 is coupled to field control circuit 201, illustrated in detail in FIGURE 3. A pair of back-to-back connected SCR's 224 and 225, connected in series with a full wave rectifier 226, are coupled between a source 227 of alternating current and field winding 57, for controlling the strength of the magnetic field. Field control 201 is designed to cause SCR's 224 and 225 to pass substantially all of both portions of the A.C. waveform from source 227 when the signal at junction C is less than 1.2 volts, causing a maximum amount of full wave direct current to pass to field winding 57, saturating the magnetic flux field of the motor.

As the input signal exceeds, either positively or negatively, the threshold value (1.2 volts at junction C), field control 201 is responsive thereto for cutting back the firing angle of SCR's 224 and 225, thus reducing the current passed to field coil 57. As previously explained, the weakened field causes the motor to increase in speed.

An auxiliary field winding, continually energized by a fixed value of D.C. current, is normally provided for D.C. motors in order to prevent a dangerous runaway condition, should the motor field fail at any time. Without the addition of such an auxiliary field winding, the motor speed would theoretically increase to infinity if the current through field coil 57 suddenly ceased to flow, caused for example by a failure of the field winding itself, or a failure of certain of the components in field control 201. Such a runaway condition, in practice, could cause the destruction of the motor. Therefore, to maintain a minimum magnetic flux field for safety purposes, an auxiliary winding 230 is coupled through a full wave rectifier 231 to A.C. source 27. Of course, auxiliary winding 230 and its associated energizing circuit may be eliminated if a different means for preventing a runaway condition is provided.

Field control 201 has an input network 233 for activating the field control circuit when the control signal at junction C rises absolutely above 1.2 volts. For this purpose, four diodes 234 are connected in a full wave rectifier bridge between junction C and ground 51. Each diode 234 has a 0.6 voltage drop thereacross when conducting. These diodes, as well as all other diodes in the system requiring a 0.6 voltage drop in the forward direction, may be silicon type 1N1696. A series circuit is connected across the output of the diode bridge, including a 2.7 kilohm resistor 236, a 56 kilohm resistor 237, and a 2.7 kilohm resistor 238. Resistor 237 is bypassed by a 3.3 microfarad capacitor 239.

Coupled to input network 233 is a difference emitter follower 242 having a pair of output lines 243 and 244. As will appear, output lines 243 and 244 at all times have equal output voltages that are of opposite polarity with respect to the polarity of a reference line 245. As the input signal at junction C increases above 1.2 volts, the voltages on lines 243 and 244 increase proportionally in an absolute manner from the voltage on line 245.

Difference emitter follower 242 is formed from a NPN transistor 248, as a 2N1304, and a PNP transistor 249, as a 2N305, connected in a unique circuit which may generally be described as the emitter follower type. The base of each transistor 248 and 249 is coupled to a different side of resistor 237. The collector and emitter electrodes of the two transistors are connected in a series circuit between the +15 and —15 volt D.C. source. This series circuit consists of a 680 ohm resistor 251 connected between +15 volts and the collector of transistor 248, a pair of 100 ohm resistors 252 and 253 connected between the emitters of transistors 248 and 249, and a second 680 ohm resistor 254 connected between the collector of transistor 249 and —15 volts. The reference line 245 is connected to the junction point between resistors 252 and 253. The output lines 243 and 244 of the difference emitter follower are coupled to resistors 252 and 253.

The signal at junction C, whether positive or negative with respect to ground 51, passes through the two correspondingly poled diodes 234 to the series circuit of input network 233. For signals below the threshold value, the largest voltage drop occurs across the conducting diodes. However, since diodes 234 have a maximum 0.6 voltage drop thereacross, an input signal which exceeds absolutely 1.2 volts causes the voltage coupled to one base of the transistors 248 and 249 to rise in direct proportion to the magnitude of the signal. By way of example, it will be assumed that a —4.0 volt signal exists at junction C. This arbitrarily selected signal, in the constant horsepower range, will be used in conjunction with this and the remaining drawings to illustrate the operation of the circuit for a specific signal.

As junction C goes to —4.0 volts, a total of —1.2 volts is dropped across the two conducting diodes 234, with the remaining —2.8 volts being dropped across the remaining portion of input network 233. Since resistor 237 is of much greater resistance than resistors 236 and 238, substantially all of the voltage drop occurs across this resistor. Therefore, the base of transistor 248 is substantially at the voltage dropped across diode 234, namely —0.6 volt. Another —2.8 volts is dropped across resistor 237, causing the base of transistor 249 to be approximately at —3.4 volts. The remaining —0.6 volt drop occurs substantially across the other of the conducting diodes 234.

The —3.4 volt signal at the base of transistor 249 heavily forward biases this transistor, causing a large current flow through the series circuit connected to the collector-emitter electrodes. Since the emitter-base junction of transistor 248 has not been affected by the negative input signal, transistor 248 has a relatively high resistance with respect to the resistance of transistor 249. The resulting current flow between the + and — D.C. sources produces a 2.4 volt drop across resistors 252 and 253.

It should be noted that because transistors 248 and 249 present different impedances to the series circuit, the junction point corresponding to line 245 no longer remains at substantially zero volts potential, but changes in proportion to the signal at junction C. However, since resistors 252 and 253 are of equal value, the voltages on lines 243 and 244 always are of equal absolute magnitude with respect to the instantaneous voltage on reference line 245, and are of opposite polarity. Thus, difference emitter follower 242 generates a pair of output signals of equal amplitude and opposite polarity, whose amplitude depends on the amplitude of signal at junction C. As the signal at C varies between 0 and ± 1.2 volts, the voltage on lines 243 and 244 remains substantially zero. When the signal at junction C increases either positively or negatively beyond 1.2 volts, the absolute values of the voltages on lines 243 and 244 increase from the voltage on reference line 245, in direct proportion to the amplitude of signal at junction C.

The output signals on lines 243 and 244 bias pulse forming means 257 and 258, controlling the time of generation of the pulses which fire SCR's 224 and 225 respectively. When the output signals on lines 243 and 244 are substantially near zero potential, pulse forming means 257 and 258 generate a pulse substantially at the beginning of each half cycle of A.C. from source 227, causing SCR's 224 and 225 to pass substantially all of the A.C. waveform. However, as the absolute magnitude of the signals on lines 243 and 244 increases, the time of firing of the SCR's is retarded, reducing the amount of current coupled to field coil 57.

The instantaneous phase of the A.C. waveform from source 227 must be monitored in order to determine the correct time for firing pulse forming means 257 and 258. For this purpose, a driving means 260, having a driving waveform output on a line 261, is coupled to A.C. source 227. Line 261 is coupled to both of the pulse forming means 257 and 258. By comparing the relative magnitude of the driving signal on line 261, with the bias signal on lines 243 and 244, the time of firing for SCR's 224 and 225 is established.

Source 227 is formed by a transformer 263 having a primary winding 264 and a secondary winding 265. Since the A.C. waveform from source 227 does not have to be related in phase to the A.C. waveforms 17 gated to the armature of the motor, primary 264 may be coupled across any phase of source 10, illustrated in FIGURE 1, or may be coupled to an independent A.C. power source. One side of secondary winding 265 is coupled to ground 51. The other side 266 of the secondary winding has an A.C. waveform thereon of 160 volts RMS potential with respect to ground 51. Secondary winding 265 also has a tap 267 thereon, coupled to full wave rectifier 231 for producing a fixed D.C. current for auxiliary field 230. Tap 237 has a 55 volt RMS potential with reference to side 266.

The single phase A.C. signal on line 266 is coupled through a D.C. blocking capacitor 270 to a line 271 common to SCR's 224 and 225, the input of driving means 260, and full wave rectifier 231.

Driving means 260, in conjunction with pulse forming means 257 and 258, operates in an identical manner with driving means 43 and pulse forming means 23 and 24 for one phase of A.C. waveform in the armature control circuit. The operation of these circuits will be described in sufficient detail for the purposes of understanding the present invention, however, for a more complete description of these circuits, reference may be made to the before identified copending application.

The A.C. waveform on line 271 is similar to waveform 17' illustrated in FIGURE 4. This waveform is coupled through a 20 kilohm resistor 273 to clipping diodes 274 and 275, poled in opposite directions. The 0.6 forward voltage drop across each conducting diode produces a low amplitude generally square wave signal similar to square wave 98', illustrated in FIGURE 5. It should be noted that the waveforms in FIGURES 5, 6, and 7 are illustrated greatly enlarged with respect to the waveform in FIGURE 4.

Square wave 98' is integrated by a 1000 ohm resistor 276 and a 3.3 microfarad capacitor 277 for producing on line 261 a ramp shaped driving waveform, similar to waveform 44' in FIGURE 6. This driving waveform has a actuating or peak portion similar to portion 47'. However, it should be noted that the driving waveform on line 261 varies with reference to the potential of line 245, and not with reference to ground 51 as was true of the driving waveform from driving means 43 in FIGURE 1.

The driving waveform on line 261 has a peak ±1.1 volt potential. This waveform is coupled through a 2.7 kilohm resistor 280 to the base of an NPN transistor 281 in pulse former 257, and through a 2.7 kilohm resistor 282 to the base of a PNP transistor 283 in pulse former 258. The emitter of transistor 281 is coupled through a 100 ohm resistor 285 to output line 243 from difference emitter follower 242. Similarly, the emitter electrode of transistor 283 is coupled through a 100 ohm resistor 282 to output line 244 of the difference emitter follower.

Transistors 281 and 283 generate a pulse when the potential difference between the waveforms on line 261, compared with the waveforms on either lines 243 or 244, forward biases the emitter-base junction of the transistor. When the control circuit is operating in the constant torque range, substantially zero potential exists on lines 243 and 244. Therefore, the driving waveform, seen in FIGURE 6, drives transistor 281 into conduction during the first or positive half cycle when the driving waveform crosses the zero axis and goes positive, at point 153. Similarly, the negative going driving waveform drives transistor 283 into conduction during the second or negative going half cycle, when the waveform again crosses the zero axis and goes negative. As explained in detail in our copending application, these crossover points occur approximately 30° after the beginning of each half cycle of A.C. waveform 17. Therefore, transistors 281 and 282 are conductive for approximately 150° of each half cycle of A.C. waveform on line 271. This is sufficient to pass substantially full wave rectified current to field winding 57.

The remaining components in pulse forming means 257 and 258 merely help to form and shape the pulse output when transistors 281 and 283 are forward biased, as explained in our before identified copending application for pulse forming means 23 and 24. For the purpose of this disclosure, it is sufficient to note that pulse forming means 257 produces an output pulse 139 on lines 288, and pulse forming means 258 produces an output pulse on lines 289, which triggers the SCR associated therewith essentially at the same time that the respective transistors 281 or 283 become conductive.

As the input control signal at junction C rises above the transfer point, the absolute values of the voltages on lines 243 and 244, which tend to back bias the transistors 281 and 283, increase with reference to the voltage on line 245. This in turn causes the transistors to be forward biased at a later time in the half cycle, when the potential of the driving waveform exceeds the level of the bias output signal from difference emitter follower 242. Since line 243 always goes positive with respect to line 245, and line 244 always goes negative with respect to line 245, transistors 281 and 283 can only be energized during the positive and negative half cycles, respectively, of the A.C. waveform on line 271.

For example, when a −4 volt signal exists at junction C, line 243 goes approximately 1.2 volts positive, and line 244 goes approximately 1.2 volts negative, with respect to line 245. Since the ramp shaped driving waveform on line 261 never exceeds approximately ±1.1 volts magnitude with respect to line 245, both transistors are back biased. This prevents a pulse from being generated, thereby preventing SCR's 224 and 225 from gating any portion of the A.C. waveform to full wave rectifier 226. As a result, the field current through coil 57 ceases to flow, causing the motor to run at its maximum speed. Of course, the values of the resistors and other components can be changed so as to vary the magnitude of the control signal at junction C which blocks the current flow to field coil 57.

Because the oppositely going portions of the driving waveform on line 261 are symmetrical, and because the bias signals on lines 243 and 244 are of equal and opposite potential at all times, SCR's 224 and 225 pass identical portions of the A.C. waveform, e.g., the last 120° of each half cycle, causing a D.C. current output from rectifier 226 with minimum ripple. The difference emitter follower, in conjunction with the pulse forming means and the SCR gating circuit, are useful in many applications where current is to be gated to a load, and are not limited to use in a motor control circuit.

Full wave rectifier 226 is formed from diodes 291, 292, 293, and 294, poled to provide a unidirectional conduction path to field coil 57 for rectifying the alternately gated similar portions of A.C. waveform. The relatively large inductance of the field coil aids in smoothing out the fluctuations in the D.C. level.

When current flow to an inductor is decreased, the collapsing magnetic field around the inductor attempts to maintain the current flow in the original direction, as is well known. As a result, the voltage across the field coil tends to decrease slowly, which is undesirable in motor speed control applications. However, according to the invention, series diodes 293 and 294 form a shunt path across field coil 57. Similarly, diodes 291 and 292 form a series shunt path to ground 51 across field coil 57. The diodes 291–294 are poled to short out the voltage generated by the collapsing magnetic flux around the field coil, thereby quickly dissipating this undesired energy, allowing the motor to respond quickly to new speed commands.

FIELD CUTOFF

The field cutoff circuit 203 for disabling SCR's 224 and 225 is illustrated in detail in FIGURE 3. Two field cutoff controls are provided; an automatic control responsive to excessive values of back EMF, and a manual control for cutting off the field to reduce heating when the motor is shut down.

For the automatic cutoff control, the back EMF across the armature is reduced in magnitude to a value suitable for use with transistors. A voltage divider network, consisting of a series connected 330 kilohm resistor 300 and a 560 ohm resistor 301, is coupled between junction point B and ground 51. Resistor 301 is shunted by a 0.2 microfarad bypass capacitor 302. The resistance values of the voltage divider are choosen to cause a junction point 303, between resistor 300 and resistor 301, to have a ±0.8 volt potential when the back EMF reaches an excessive value, as 280 volts.

Junction point 303 is directly coupled to the bases of an NPN transistor 305, as a 2N1304, and a PNP transistor 306, as a 2N1305. The emitter of transistor 305 is coupled through a diode 307 to ground 51. Similarly, the emitter of transistor 306 is coupled through an oppositely-poled diode 308 to ground 51. Diodes 307 and 308 are choosen to have a 0.6 voltage drop thereacross when conducting. Since approximately 0.2 volt is necessary to forward bias the emitter-base junction of transistors 305 and 306, a 0.8 volt signal at junction 303 causes either transistor 305 or 306 to conduct, depending upon the polarity of the voltage.

Transistors 305 and 306 are part of a voltage switching circuit connected to the input of the difference emitter follower 242 in field control 201. The collector of transistor 305 is coupled to +15 volts D.C. through a 5.6 kilohm resistor 310, and to the base of a PNP transistor 311 through a 2.7 kilohm resistor 312. The emitter of transistor 311 is connected to +15 volts, and the collector is connected through a 56 kilohm resistor 313 to the base of transistor 248 in emitter follower 242. Similarly, the collector of transistor 306 is coupled to −15 volts D.C. through a 5.6 kilohm resistor 315 and to the base of an NPN transistor 316 through a 2.7 kilohm resistor 317. The emitter of transistor 316 is connected to −15 volts, and the collector is coupled through a 56 kilohm resistor 318 to the base input of transistor 249 in emitter follower 242.

Assuming, for example, that the back EMF across the forwardly rotating motor reaches +280 volts, a −0.8 volt exists at junction point 303. This potential drives transistor 306 into its conducting state, clamping the potential at the base of transistor 316 to a value near the potential of ground 51. As a result, transistor 316 conducts heavily, thereby switching the −15 volts on the emitter across resistor 318 in the collector circuit. This −15 volts is coupled through resistor 318 to the base of transistor 249, causing difference emitter follower 242 to produce a pair of bias signals which cut off SCR's 224 and 225, in a manner similar to that previously described when a −4.0 volt control signal at junction C caused the base of transistor 249 to go negative.

If a +0.8 volt signal existed at junction 303, transistors 305 and 311 would be switched into their conducting states, driving the base of transistor 248 positive. This would generate bias signals which would retard the occurrence of the gating pulses sufficiently to disable SCR's 224 and 225.

With the circuit described, excessive back EMF quickly disables the SCR's which pass current to the field winding 57. Furthermore, diodes 291–294 shunt the voltage produced by the collapsing magnetic field of winding 57, causing the excessive EMF across the armature to be quickly dissipated to a safe level, at which time the field control is automatically enabled for further control over the motor.

When it is desired to shut down the field manually, a switch 320 is closed, connecting −15 volts directly to the collector of transistor 316, blocking the SCR's in the same manner as when transistor 316 was automatically switched. Of course, switch 320 could be connected between +15 volts and the collector of transistor 311.

PHASE BACK—GENERAL

When the motor is to decelerate, the phase back circuit 204 illustrated in FIGURE 1 becomes operative to retard the firing angles of SCR's 20 and 21 in the motor armature circuit. The detailed reasons for retarding the firing angle, and the general operation of the phase back circuit will now be explained with reference to FIGURE 1 in conjunction with the waveforms illustrated in FIGURES 4–7.

Each of the power waveforms 17 available from power source 10 is coupled through 24 kilohm resistors 94 to diodes 95, 96 in the ramp forming circuit 43, in order to produce a square wave output 98. This square wave is integrated by a resistor 99 and a capacitor 100 to produce the ramp shaped driving waveform 44 which energizes the transistors in pulse forming means 23 and 24, as explained in detail in our before identified copending application. When driving waveform 44 exceeds the level of bias 127 on output line 39, or the level of bias 128 on output line 36, the reverse 24 or forward 23 pulse forming means, respectively, is energized to produce an output pulse 139 for gating the SCR's 21 or 20 associated therewith. This operation is also similar to that described in FIGURE 3 for pulse forming means 257 and 258, having a ramp driving waveform on line 261 and a bias input on lines 243 and 244.

Assuming that a negative input signal is present at junction A, which establishes a bias at 39' represented by line 127 in FIGURE 6, reverse pulse forming means 24' is energized at the time ramp waveform 44' crosses the bias level, i.e., point 129. Forming means 24' generates a pulse 139 which energizes SCR's 21' at a point preceding point 47' by approximately 100°, as indicated by dashed line 330. However, SCR 21' does not conduct for the remaining 100° of the half cycle of waveform 17' coupled thereto, due to the nature of the motor load. That is, assuming the motor has been rotating in a steady state condition, the back EMF generated across the armature is at a level 331, seen in FIGURE 4, which is just slightly less than the peak portion of waveform 17'. As a result, SCR 21' is only forward biased until the A.C. waveform 17' falls below the level of back bias 331, at point 332, thus again reverse biasing the SCR. This small angle of conduction gates a voltage to the armature which is greater than the back EMF voltage, producing a current flow which just overcomes losses, keeping the armature rotating at the same speed.

Now assume the motor is to reverse its direction of rotation, and phase back 204 is removed from the control circuit. The input control signal at junction A goes positive shortly after the occurrence of point 332 (preventing reverse pulse forming means 24 from again generating pulses). At the same time, the forward pulse forming bias levels 128 all go more positive, towards the peak negative portions 47 of the driving waveforms. The SCR 20 which will first be fired in the current braking direction depends upon the speed at which bias level 128 changes As a representative example, it is assumed level 128 first crosses the driving waveform on line 45''', thereby actuating SCR 20''' at the time of occurrence of a point 334 on waveform 17''' in FIGURE 4.

Since point 334 precedes the crossing of the zero axis by only a few degrees, it would be expected that a small current pulse proportional to the small negative voltage at point 334 would be passed by the SCR to the load. However, because the load consists of the rotating armature 12, the anode of SCR 20''' is not coupled to zero volt, but to the level 331 of the positive back EMF which still exists across the armature. As a result, when SCR 20''' is fired, it passes a current pulse proportional to the total shaded area 335 in FIGURE 4, i.e., proportional to the difference between the voltage 17''' at point 334 and the voltage level 331. This large current pulse violently brakes the motor, and may cause damage, as previously explained.

Phase back circuit 204 prevents large surges of braking current, such as that designated by 335 in FIGURE 4, from being gated to the armature. When the change in speed, as indicated by the change in control signal at junction A, and the instantaneous direction and speed of the motor, determined from the back EMF at junction B, indicates that the motor is to decelerate, a relay RR (not illustrated in FIGURE 1) in phase back circuit 204 is energized, causing its contacts R', R'' and R''' to close.

Each single pole single throw contact R is connected between a junction 336 between resistors 94 and 99, and a 36 kilohm resistor 337, for each phase of source 10. Each resistor 337 in turn is connected to the phase of A.C. waveform which lags by 120° the A.C. waveform at the junction 336 connected to the relay contact R associated therewith. Therefore, when relay RR in phase back 204 is energized, a sine wave lagging by 120° is added to the sine wave normally coupled from source 10. This produces a new sine wave, on the lines between resistors 94 and 99, which lags the original by 55°, for the values given.

Because the new sine waves are coupled across diodes 95 and 96, a new square wave for each phase, retarded 55° from the position 98 illustrated in FIGURE 5, is generated. This phase shifted square wave is integrated by resistor 99 and capacitor 100 for each phase, producing three driving waveforms retarded 55° from the position 44 illustrated in FIGURE 6.

The retarded driving waveforms cause pulse forming means 24 to generate a pulse on lines 27 which lags by 55° the position 139 illustrated in FIGURE 7. Therefore, SCR 21''' does not gate A.C. waveform 17''' at point 334, but rather at a new point 340 retarded 55° from point 334. The resulting braking current flow through SCR 21''' is proportional to the shaded area 341, and hence is substantially smaller than the current pulse 335 that would otherwise be passed without phase back circuit 204.

The current surge passed by SCR 21''' causes armature 12 to decrease in speed. Since less back EMF is generated at slower speeds, the back EMF drops to a new level 343 which is lower than the level 331 that previously existed across the armature.

Assuming, for example, that motor 13 is now to rotate in the forward direction, the control signal at junction A will still be positively increasing after having crossed the zero axis, causing the armature control circuit to increase the firing angle of SCR's 21. Each SCR 21 is fired in succession, at an angle which precedes the previous firing angle by a small amount. This in turn gates a braking current pulse to armature 12, reducing the speed of the rotating armature and decreasing the level of back EMF to a new value, as seen in FIGURE 4 for several cycles of operation.

After a sufficient number of braking current surges are gated to armature 12, depending upon the original speed of the motor, the back EMF decreases to a level 345 which is insufficient to keep phase back circuit 204 energized, as will appear. At this time, relay RR in phase back circuit 204 is deenergized, opening the contacts R, and hence advancing the next firing angle by 55° to a point 346, seen in FIGURE 4. The resulting current surge, which is larger than previous current surges, produces too much correction compared to the previous rate of change of speed of the motor. Since the motor is usually connected in a closed loop system, as by a tachometer connected in control signal source 28 for changing the control signal as the speed changes (disclosed in our co-pending application), a smaller magnitude control signal is immediately developed to compensate for this over-correction. The armature control circuit is responsive to the smaller control signal for cutting back the firing angle of the succeedingly gated SCR's to a new point 347, representative of the desired rate of change of speed.

As the motor picks up speed in the opposite direction, the absolute level of back EMF increases relative to zero axis 151. The level of back EMF rises until a steady state condition is reached, in which the voltage difference causes a current to flow of a value just sufficient to overcome the losses of the rotating motor.

From the above description, it is apparent that phase back circuit 204 automatically cuts back the firing angle of the SCR's to decelerate the motor smoothly, and automatically disconnects itself after the motor has sufficiently decelerated. While a preferred example has been explained, using a phase back angle of 55°, other angles are also useful. For example, the phase back angle could be 80°. It should also be noted that since armature 12 is inductive, the voltage across the armature itself rings to some extent, causing the current to continue to flow for a relatively insignificant period of time beyond the cutoff of the SCR.

PHASE BACK—DETAILED

In FIGURE 2, the detailed phase back circuit 204 for energizing relay RR, and hence closing the three contacts R of FIGURE 1, is illustrated. The input control signal at junction C is summed through a 5.6 kilohm resistor 350 with the back EMF through a 220 kilohm resistor 351 and a 1.5 megohm resistor 352. The resulting summed signal, at a junction 353 between resistors 350 and 352, has either a positive or negative potential depending upon the relative magnitudes of the signals from junction B and junction C. This summed signal is amplified by a differential amplifier 355, and coupled through an emitter follower 356 to dual transistors 358 and 359. Only one of the dual transistors is energized by the signal at junction 353, forming a unidirectional conductive path to one side of reed relay RR. The other side of relay RR is connected to a junction 361 at which the back EMF is clipped by Zener diodes 362 and 363 to a low amplitude, as ±18 volts. The clipped signal is either positive or negative, depending upon the instantaneous polarity of the back EMF.

The resistance values, as will appear, are so chosen that junction 353 normally has a potential opposite to the potential at junction 361. When the motor is to decelerate, the polarity of the potential at junction 353 changes, energizing the other of the dual transistors 358 and 359, and thus forming a conductive path to ground 51 through relay RR. This causes a phase back signal to flow between junction 361 and ground 51. Since relay RR is in series with the signal path, it is energized at this time, closing the normally opened contacts R illustrated in FIGURE 1, to retard the firing angle of the armature SCR's as previously explained.

Resistor 350 has a value to allow, when motor 13 is running in a steady state condition, a greater amount of signal to pass through resistor 350 than through resistor 352, thus causing junction 353 to have the same potential as the potential at junction C. Since the back EMF is always opposite to the potential of the control signal, junction 353 is always opposite to the potential of junction 361 when the motor is in a steady state condition.

When the motor is to increase its speed, i.e., accelerate, the signal at junction C increases in magnitude. This merely increases the magnitude of the summed signal at junction 353, and hence the polarity remains the same. However, when the motor is to decelerate, the signal at junction C decreases in magnitude, that is, it goes towards the potential of the back EMF, and hence the potential at junction 353 changes in polarity and becomes the same polarity as the signal at junction 361.

Junction 353 is connected to the base of a NPN transistor 366, as a 2N1613, which forms a part of differential amplifier 355. The collector of transistor 366 is coupled through a 2.7 kilohm resistor 367 to +15 volts. The emitter of transistor 366 is coupled through a one kilohm resistor 368, a variable resistor 369 adjustable from zero to 800 ohms, and a 2.2 kilohm resistor 370 to −15 volts. A second NPN transistor 372, the same type as transistor 366, has its collector coupled through a 5.6 kilohm resistor 373 to +15 volts, and its emitter coupled through a one kilohm resistor 374 to variable resistor 369. The base of transistor 372 is coupled through a 5.6 kilohm resistor 375 to ground 51.

Emitter follower 356 uses a NPN transistor 378, as a 2N1304, whose base is coupled to resistor 373 of amplifier 355. The collector of transistor 378 is directly coupled to +15 volts. The emitter of this transistor is connected through a 5.6 kilohm resistor 379 to −15 volts.

A 1.2 kilohm resistor 380 directly couples the emitter of transistor 378 to the bases of dual transistors 358 and 359. The emitters of each of the dual transistors are directly coupled to ground 51. The collector of transistor 358 is coupled through a diode 382, as a 1N4001, to one side of relay RR. Similarly, the collector of transistor 359 is coupled through a diode 383, the same type as diode 382 but oppositely poled, to the same side of relay RR. Dual transistors 358 and 359 are complementary, as types 2N1304 and 2N1305, respectively.

The operation of phase back 204 will now be explained, assuming steady state conditions, with +240 volts back EMF at junction B, and —4.0 volts control signal at junction C. Resistor 351 drops the back EMF to approximately ⅓ the value at juncton B, or +80 volts. A 0.47 microfarad capacitor 385 bypasses to ground 51 any transients riding on the back EMF. The resulting summed signal at junction 353 is approximately —0.2 volt.

Variable resistor 369 is adjusted to cause transistor 366 to conduct, causing the amplifier 355 to operate as a conventional differential amplifier, having an overall gain of approximately three. The resulting —0.6 volt signal at resistor 380 forward biases transistor 359. However, no current path to ground 51 is formed through relay RR, since the emitter of transistor 359 and diode 383 are poled to block positive back EMF, which now exists at junction 361.

If the motor is to increase in speed, the —4.0 volt signal at junction C goes further negative causing the summed signal to go more negative. This merely drives transistor 359 further into its conducting state, and hence no current path for relay RR is formed. However, if the control signal at junction C changes to 0 volt, indicating the motor is to decelerate, junction 353 goes to a +0.2 volt potential, causing a +0.6 volt potential to be coupled to the bases of the duel transistors. This signal switches the conduction state of both transistors, driving transistor 359 into its nonconducting state, and transistor 358 into its conducting state. As a result, a current path is formed from junction 361, through relay RR, diode 382, and conducting transistor 358 to ground 51, thereby energizing the relay and activating the phase back circuit.

To produce the clipped back EMF signal at junction 361, junction B is coupled through a 750 ohm resistor 386, and back-to-back connected Zener diodes 362 and 363 to ground 51. These Zener diodes have an 18 volt drop thereacross when reversed biased, for producing a +18 volt potential at junction 361, depending upon the polarity of the back EMF. A pair of relays 388 and 389 are connected across the Zener diodes, as illustrated in FIGURE 2. If the back bias is positive, indicating that the motor is rotating in its clockwise or reverse direction of rotation, relay 388 is energized, relay 389 being shunted by the forward conducting diode 363. Similarly, if the back EMF is negative, relay 389 is energized to indicate a counterclockwise or forward direction of rotation. These relays may be connected to an external system for indicating the instantaneous direction of rotation of the motor. Of course, if the control system disclosed herein is not connected into a larger system, relays 388 and 389 may be eliminated.

While the phase back circuit of FIGURE 1, using a switching system which selectively phases back only when the motor is to decelerate, is preferred, the modification illustrated in FIGURE 1a is useful in certain less critical applications.

The circuit of FIGURE 1a is used in place of phase back 204, relay contacts R, and resistors 337 of FIGURE 1, and hence allows substantial simplification while retaining some of the desirable features of the preferred system. A source of D.C. voltage 160 is coupled through resistors 161 to each of the junction points 336 connected to the diodes 95, 96 of FIGURE 1. Source 160 has a positive or negative voltage output which is opposite to the voltage gated to the motor armature. This D.C. voltage from source 160 biases either diode 95 or 96 into conduction, hence changing the apparent zero line 151 of FIGURE 4, as seen by the diodes. Therefore, the portion of power waveform 17 which is clipped to form square wave 98 of FIGURE 5 is changed, which in effect shifts the square waves backwards, and thus retards the firing angle of the SCR's, as was true of the phase back circuit previously described.

Any source 160 which has a D.C. voltage proportional to the back EMF generated by the armature is suitable for this circuit. For example, point 160 could be connected to a voltage divider connected between junction B and ground 51. Also, a voltage available from a tachometer connected to the rotating motor could be used.

Although the circuit of FIGURE 1a is operative at all times (including the majority of time when the motor is not decelerating), the SCR's are phased back most when the back EMF is of a large magnitude, and hence when the deceleration of the motor would cause the largest surges of braking current. Therefore, this circuit provides protection when it is most needed, although it also hinders the operation of the motor at high speeds.

Of course, the circuit of FIGURE 1a can be modified, as taught by the phase back circuit of FIGURE 1, by inserting a relay contact R between point 160 and resistors 161, and closing that contact only when the motor is to decelerate. This would cause the motor control to phase back only when the motor was to decelerate, and by an angle proportional to the back EMF existing across the armature.

CLAMP

Clamp circuit 205, for clamping junction D (of line 29 of FIGURE 1) at a minimum magnitude when the motor is rotating near or in excess of base speed, is illustrated in detail in FIGURE 2. This circuit includes a pair of transistors 400 and 401 which are normally maintained in their nonconducting state. When the back EMF at junction B exceeds a predetermined amount, one of the pair of transistors 400, 401 is energized to clamp the signal at junction D at a minimum magnitude.

For this purpose, a voltage divider network, consisting of a 100 kilohm resistor 403 and a one kilohm resistor 404 is connected in series between resistor 351 and ground 51. The junction point 405 between resistors 403 and 404 is directly connected to the base of a NPN transistor 407, as a 2N1304, and a PNP transistor 408, as a 2N1305. The collectors of transistors 407 and 408 are respectively connected to +15 and —15 volts. The emitter of transistor 407 is connected through two diodes 410 and 411, having a 0.6 volt drop thereacross when conducting, as 1N4001, to the emitter of transistor 408. The junction point 412 between diode 410 and diode 411 serves as an output terminal which is switched to a finite potential when the motor exceeds a predetermined speed.

In operation, resistors 403 and 404 are chosen to have a value which causes junction 405 to have a 0.8 volt signal, either positive or negative, when the clamp circuit 205 is to be energized. For the specific values disclosed, point 405 is ±0.8 volt when junction B is approximately ±240 volts.

Transistors 407 and 408 require approximately a 0.2 volt difference in potential between their base and emitter electrodes in order to forward bias the junction, driving the transistors into their conducting state. Since the emitter of each transistor is in series with a diode having a 0.6 volt drop thereacross when conducting, transistors 407 and 408 remain nonconducting until a 0.8 volt potential difference is impressed in the correct direction across their emitter-base junction, at which time they switch into their conducting state.

As a representative example, it will be assumed that the back EMF at junction B rises to +240 volts. This causes a +0.8 volt at junction 405, which drives transistor 407 into its conducting state. As a result, junction 412, which is normally at zero volt, is driven to approximately a +5.0 volt potential. If the back EMF had risen above 240 volts, transistor 407 would merely be driven further toward saturation, producing a larger amplitude positive potential at junction 412. This positive signal switches transistor 400 into its conducting state, as will appear. If junction 405 was −0.8 volt, transistor 408 would be forward biased, causing junction 412 to go to −5.0 volts, which in turn would drive transistor 401 into its conducting state.

Transistors 400 and 401 are complementary, as a NPN 2N1304 and a PNP 2N1305, respectively. The bases of transistors 400 and 401 are respectively coupled through 2.7 kilohm resistors 414 and 415 to junction point 412. A 47 kilohm resistor 417 is coupled between the base of transistor 400 and −15 volts. Similarly, a 47 kilohm resistor 418 is coupled between the base of transistor 401 and +15 volts.

The emitter of transistor 400 is coupled to a constant voltage source, consisting of a 2.7 kilohm resistor 420 and a 1N4001 diode 421 in series between ground 51 and −15 volts. A junction point 422 between diode 421 and resistor 420 is directly coupled to the emitter of transistor 400. Diode 421 is chosen to have a −0.6 volt drop thereacross when conducting. Since this diode is poled to pass current continually through the series circuit, point 422 remains at a fixed −0.6 volt potential, i.e., the voltage drop across diode 421, regardless of the other voltages existing in the circuit.

In a similar manner, a second constant voltage source is formed by a 1N4001 diode 425 and a 2.7 kilohm resistor 426 connected in series between +15 volts and ground 51. A junction point 427 between diode 425 and resistor 426, clamped at +0.6 volt by the forward drop across diode 425, is directly coupled to the emitter of transistor 401. The collectors of transistors 400 and 401 are respectively coupled through diodes 429 and 430 to junction D. Diodes 429 and 430 are chosen to have a 0.2 voltage drop thereacross when conducting.

In operation, when transistors 407 and 408 are nonconducting, a current flows from +15 volts, through resistors 418 and 415 to junction 412, and through resistors 414 and 417 to −15 volts. This biases the base of transistor 401 at +0.5 volt, and the base of transistor 400 at −0.5 volt. However, since the emitter of transistor 401 is at +0.6 volt, and the emitter of transistor 400 is at −0.6 volt, both transistors are back biased and remain nonconducting. The collector electrode of each transistor is therefore open circuited, and diodes 429 and 430 have no effect on junction D, thus allowing line 29 of FIGURE 1 to have any voltage signal thereon between the maximum positive and maximum negative values set by the ±1.2 voltage drop across diodes 88 and 89.

When junction 412 is switched to +5 volts, for example, transistor 400 is driven into saturation. Junction D is now connected through diode 429 and transistor 400 to junction 422, which remains at −0.6 volt. It will be recalled that the back EMF is at this time positive, and thus the control signal at junction D must be negative. Since junction 422 remains at −0.6 volt, it is apparent that no path is formed through diode 429 and the collector-emitter junction of transistor 400 when junction D is −0.6 volt, or more negative. Even if junction D goes to −0.4 volt, causing junction 422 to be +0.2 volt relative to junction D, no conduction path is formed since both a +0.2 volt is needed to break-over diode 429, and another +0.2 volt is needed to break over the collector-emitter junction of transistor 400. However, if the control signal at junction D attempts to decrease in absolute magnitude below −0.2 volt, as for example if it tries to go to −0.1 volt, junction 422 becomes positive relative to junction D and of a value sufficient to break-over the total 0.4 volt drop needed across diode 429 and transistor 400, thus clamping junction D to a minimum absolute magnitude of −0.2 volt.

If the control signal had been positive, the back EMF would be negative. When the back EMF exceeded the predetermined level, transistor 401 would be energized, thereby clamping junction D to +0.2 volt or more positive. Thus, it is apparent that clamp 205 maintains an absolute voltage on line 29 of a value chosen to prevent reverse firing, whenever the back EMF exceeds a predetermined magnitude.

The control circuits disclosed herein may be used in different combinations, and with various loads, depending upon the exact application. Furthermore, many of the circuits disclosed herein can be used in a wide variety of control applications, in addition to the control of a D.C. motor.

We claim:

1. In a control system for a motor having an armature and a field coil and including a source of control signal having an amplitude which represents a desired motor speed, a control circuit, comprising:

field control means for controlling the magnitude of a magnetic flux generated by said field coil, said magnetic flux being cut by the rotating armature to produce a back EMF;

armature control means coupled to said source and responsive to a first range of amplitudes of said control signal for impressing across said armature a second range of voltages independent of the amplitude of the back EMF, the difference between the independent second voltage and the back EMF controlling the current through the armature; and means coupled to said armature and responsive to said back EMF for modifying the operation of said armature control means, affecting the independent voltage impressed across said armature.

2. The control circuit of claim 1 including a source of A.C. waveform, said armature control means including gating means coupled between said A.C. source and said motor for passing variable amounts of said A.C. waveform in proportion to the magnitude of said control signal, said modifying means being responsive to said back EMF and said control signal for retarding the time at which said gating means passes said waveform, thereby modifying the armature voltage.

3. The control circuit of claim 2 wherein said modifying means includes switching means which retard the time of activation of said gating means only when energized, and means responsive when said motor is to decelerate for completing a current path including said switching means, thereby energizing said switching means to retard the time of activation of said gating means.

4. In a control system for a motor having an armature and a field coil and including a source of control signal having an amplitude which represents a desired motor speed, a control circuit, comprising: armature control means coupled to said source and responsive to a first range of amplitudes of said control signal for impressing across said armature a second range of voltages; field control means for controlling the magnitude of a magnetic flux generated by said field coil, said magnetic flux being cut by the rotating armature to produce a back EMF; and means coupled to said armature and responsive to said back EMF for modifying the operation of said armature control means, affecting the voltage impressed across said armature, wherein said modifying means is responsive to a predetermined value of back EMF for clamping said control signal at a minimum magnitude, modifying the armature voltage when signals of said first range are present, said first range including signals below said minimum magnitude.

5. In a control system for a motor having an armature and a field coil and including a source of control signal having an amplitude which represents a desired motor speed, a control circuit, comprising: armature control means coupled to said source and responsive to a first range of amplitudes of said control signal for impressing across said armature a second range of voltages; field control means for controlling the magnitude of a magnetic flux generated by said field coil, said magnetic flux being cut by the rotating armature to produce a back EMF; means coupled to said armature and responsive to said back EMF for modifying the operation of said armature control means, affecting the voltage impressed across said armature; and wherein said field control means is coupled to said source for varying the magnitude of said magnetic flux in proportion to control signals in a third range of amplitudes, and means responsive to a predetermined value of back EMF for decreasing the magnitude of said magnetic flux.

6. A control circuit for a motor, comprising: a source of A.C. power having a waveform; gating means coupled between said power source and said motor for passing a portion of said waveform when energized; a source of control signal having a condition which indicates the desired speed of rotation of said motor; control means for energizing said gating means in response to the condition of said control signal; means coupled to said signal source for developing a phase back signal in response to a change in the condition of said control signal which indicates the motor is to decelerate; and means responsive to said phase back signal for retarding the time at which said control means energizes said gating means.

7. The circuit of claim 6 wherein said phase back developing means includes compare means having first and second inputs, means coupling said control signal to said first input, means coupling a signal representative of the direction and speed of rotation of said motor to said second input, said compare means being responsive to said last named signals for developing said phase back signal.

8. The circuit of claim 7 wherein said signal representative of the motor direction and speed comprises the back EMF generated by the rotating armature.

9. The circuit of claim 6 wherein said power source has a second waveform shifted in phase from the first named waveform, said retarding means combining a portion of said second waveform with said first named waveform for delaying the time at which said control means energizes said gating means.

10. The circuit of claim 6 wherein said control means includes unidirectional conduction means for establishing a driving signal having a predetermined phase relationship with respect to said waveform, said condition of said control signal determining a firing point on said driving signal for energizing said gating means, said retarding means being responsive to said phase back signal to add a new signal to said unidirectional conduction means which retards the phase of said driving signal, thereby retarding the time of occurrence of said firing point.

11. The circuit of claim 10 wherein said new signal is a waveform essentially the same shape as and shifted in phase from the first named waveform.

12. The circuit of claim 10 wherein said new signal has a magnitude proportional to the magnitude of the back EMF across the motor.

13. A control circuit for a D.C. motor, comprising: a source of A.C. power having a terminal, with a power waveform; pulse actuated gating means coupled between said terminal and said D.C. motor for passing a portion of the power waveform coupled thereto; a source of signal having a magnitude that indicates the amount of current to be gated to said D.C. motor; control means coupled between said source of signal and said gating means, operative to generate a pulse coupled to said gating means, and further operative to vary the occurrence of said pulse between the occurrences of predetermined points on the power waveform in proportion to the magnitude of said signal, said pulse actuating the gating means to which it is coupled for controlling the current to said motor; and deceleration means responsive to a voltage proportional to the back EMF generated by said motor and retarding the occurrence of said pulse.

14. The control circuit of claim 13 wherein said control means includes diode means having a first and a second input terminal, means coupling said first terminal to said source of power, and means coupling said second terminal to said deceleration means to vary the point on said power waveform at which said diode means conducts.

15. A control circuit for a motor, comprising: a source of signal having an amplitude representing the desired speed for the motor; control means coupled to said source for controlling the speed of said motor in response to said signal; means developing a voltage proportional to the speed of rotation of said motor; and means coupled to said voltage developing means for clamping said signal at a minimum magnitude when said voltage exceeds a predetermined value.

16. The circuit of claim 15 wherein said voltage is the back EMF generated by the rotating motor.

17. The circuit of claim 15 wherein said clamping means includes semiconductor means, said minimum magnitude corresponding to the forward voltage drop across the semiconductor means.

18. A control circuit for a motor having an armature and a field coil, comprising: a source of signal having a first range of amplitudes and a second higher range of amplitudes, the amplitude of said signal indicating the desired speed of rotation of said motor; a source of A.C. power; armature gating means coupled between said armature and said power source; armature control means responsive to signals within said first range for energizing said gating means to vary the voltage passed to said armature; means causing D.C. current to flow through said field coil including field gating means connected in a series circuit with full wave rectifier means, said series circuit being connected between said power source and said field coil; and field control means including a semiconductor circuit responsive to signals within said second range for energizing said gating means to vary the current passed to said field coil.

19. The circuit of claim 18 wherein said full wave rectifier is connected between said field gating means and said field coil, said rectifier including diodes poled to shunt a voltage created by collapsing magnetic flux around said field coil, thereby smoothly dissipating undesired field energy.

20. The circuit of claim 19 wherein said field gating means comprises a pair of parallel connected, oppositely poled, pulse actuated unidirectional conduction means, said field control means generating pulses coupled to said conduction means, the time of occurrence of said pulses being delayed in proportion to the amplitude of said signal in said second range.

21. The circuit of claim 18 including means responsive to an excessive back EMF across said armature for disabling said field gating means.

22. A control circuit for a rotating electrical machine having an armature and a field coil, comprising: a source of A.C. power, circuit means including gating means coupled to said source and a unidirectional conduction path coupled to said field coil for causing a D.C. current to flow through said field coil, generating a magnetic flux which is cut by the rotating armature to produce an EMF thereacross; and cutoff means coupled to said armature, including a network responsive to a predetermined amplitude of said EMF for disabling said gating means, said unidirectional conduction path being connected to shunt the voltage generated by the collapsing magnetic flux of said field coil, thereby smoothly dissipating the excessive EMF across said armature.

23. The circuit of claim 22 wherein said network includes semiconductor means having a predetermined voltage drop thereacross when conducting, switching means coupled to said semiconductor means and responsive to said predetermined voltage for disabling said gating means, voltage divider means having first and second impedance means coupled across said armature, a junction of said impedance means being coupled to said semiconductor means, said first and second impedance means having impedances which cause the voltage at said junction to rise to said predetermined voltage when said predetermined amplitude of EMF exists across said armature, thereby activating said switching means to disable said gating means.

24. A control circuit for a motor, comprising: a source of control signal having a condition which indicates the desired speed of rotation for said motor; control means including said motor for generating a power signal which energizes said motor in response to the condition of said control signal; and means for developing a decelerate signal independent of said power signal and in response to a change in the condition of said control signal which indicates the motor is to decelerate.

25. The circuit of claim 24 wherein said control means includes means responsive to said decelerate signal for modifying the value of current which would otherwise be passed to the armature of said motor under control of the changed condition of said control signal.

References Cited
UNITED STATES PATENTS

| | | | |
|---|---|---|---|
| 2,855,555 | 10/1958 | Anger | 318—397 |
| 3,197,688 | 7/1965 | Horner | 318—338 |
| 2,911,580 | 11/1959 | Gould et al. | 318—317 XR |
| 3,283,235 | 11/1966 | Auld et al. | 318—331 |

ORIS L. RADER, Primary Examiner

H. HUBERFELD, Assistant Examiner

U.S. Cl. X.R.

318—302, 338, 345

UNITED STATES PATENT OFFICE
Certificate of Correction

Patent No. 3,477,006  November 4, 1969

Donald G. Fair et al.

It is certified that error appears in the above identified patent and that said Letters Patent are hereby corrected as shown below:

In the drawings cancel Sheet 1 and insert the attached sheet.

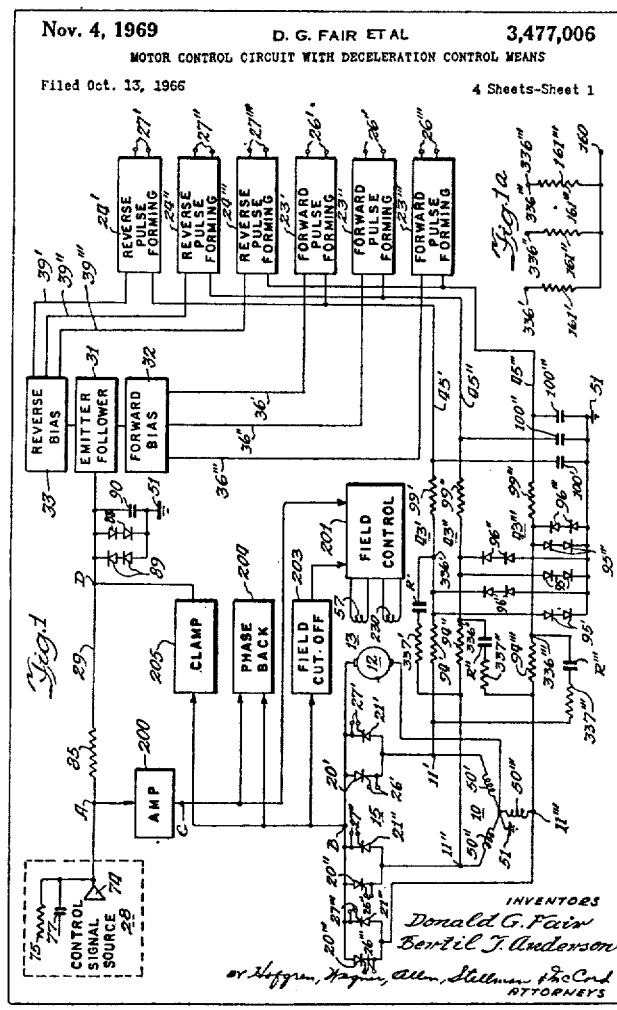

Signed and sealed this 13th day of October 1970.

[SEAL]

Attest:
EDWARD M. FLETCHER, JR.
*Attesting Officer.*

WILLIAM E. SCHUYLER, JR.
*Commissioner of Patents.*